US005857254A

United States Patent [19]

Cincotta et al.

[11] Patent Number: 5,857,254
[45] Date of Patent: Jan. 12, 1999

[54] METHOD OF DISASSEMBLING FIBER DRUMS USING A PORTABLE FIBER DRUM CHIME REMOVER

[75] Inventors: Bruce A. Cincotta, Wauwatosa; Raymond G. Sweeney, Little Chute, both of Wis.

[73] Assignee: Hydro-Thermal Corporation, Waukesha, Wis.

[21] Appl. No.: 900,970

[22] Filed: Jul. 25, 1997

Related U.S. Application Data

[62] Division of Ser. No. 431,916, Apr. 28, 1995, Pat. No. 5,651,183.

[51] Int. Cl.[6] .................................................. B23P 19/02
[52] U.S. Cl. ........................................ 29/426.2; 29/426.4
[58] Field of Search ............................... 29/403.1, 426.2, 29/426.4, 426.5; 30/400, 416, 417, 418, 422, 424, 425, 426, 427, 433

[56] References Cited

U.S. PATENT DOCUMENTS

| | | |
|---|---|---|
| 2,209,209 | 7/1940 | Ruby . |
| 2,886,887 | 5/1959 | Krist et al. . |
| 3,110,962 | 11/1963 | Krist et al. . |
| 3,161,952 | 12/1964 | Czapiewski . |
| 3,667,120 | 6/1972 | Krist . |
| 5,137,206 | 8/1992 | Hale . |
| 5,189,778 | 3/1993 | Shepard et al. . |
| 5,232,117 | 8/1993 | Hale . |
| 5,258,086 | 11/1993 | Hale . |
| 5,273,181 | 12/1993 | Gay . |
| 5,320,243 | 6/1994 | Hale . |

OTHER PUBLICATIONS

Wizard Drum Tool Co. Advertising Brochure, Bulletin W3001.
Wizard Drum Deheader Advertising Brochure, Bulletin W3000.
Wizard Drum Tool Co. Advertising Literature, WLY–115.
Wizard Drum Tool Co. Advertising Literature, WLY–102.
Wizard Drum Tool Co. Advertising Literature, WLT–101.
Wizard Drum Tool Co. Advertising Literature, WLS–102.
Wizard Drum Tool Co. Advertising Literature, WLS–101.
Wizard Drum Tool Co. Advertising Literature, WLT–102.
Recycling Fibre Drums Brochure of The Newark Group and Greif Bros. Corporation.
Wizard Drum Tool Co. Advertising Literature, Wizard Drum Deheader, 5 pages.
Wizard Drum Tool Co. Advertising Literature, No. WLY–101.
Wizard Drum Tool Co. Advertising Literature, No. WLT–103.
Wizard Drum Tool Co. Advertising Literature, No. WLS–103a.

*Primary Examiner*—David P. Bryant
*Attorney, Agent, or Firm*—Andrus, Sceales, Starke & Sawall

[57] ABSTRACT

A method of disassembling fiber drums having a fiber sidewall, a fiber bottom and an upper and lower metal chime includes the use of a portable fiber drum chime remover. The fiber drum is placed on the lower metal chime and the portable fiber drum chime remover is used to remove the upper metal chime by engaging a rotatable drive wheel against an outer surface of the upper chime and a rotatable cutting head against the inner surface of the fiber sidewall opposite the drive wheel. The portable fiber drum chime remover is then driven around the upper chime to cut the upper edge of the fiber sidewall. The fiber drum is then placed on the cut upper edge of the sidewall and the portable fiber drum chime remover is used in the same manner to cut the lower edge of the fiber sidewall slightly above the fiber bottom. The lower metal chime is then snipped to relieve tension and allow the fiber bottom and lower metal chime to be easily removed from the drum. Such cylindrical fiber sidewalls free of chimes are efficiently stored on a pallet by slitting the cylindrical fiber sidewall of the second and subsequent drums, opening the sidewalls along the slit, and respectively placing the open sidewalls concentrically around the fiber sidewalls previously placed concentrically on the pallet.

6 Claims, 4 Drawing Sheets

FIG. 3
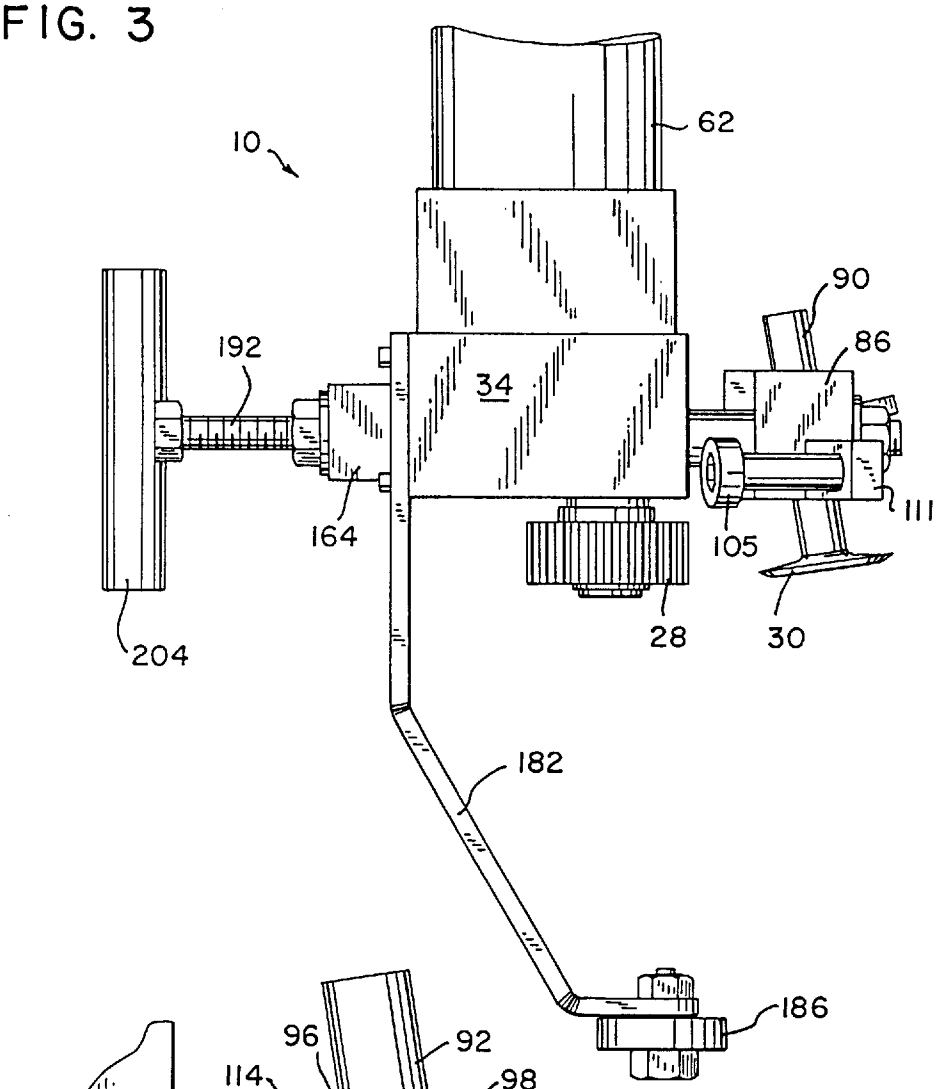
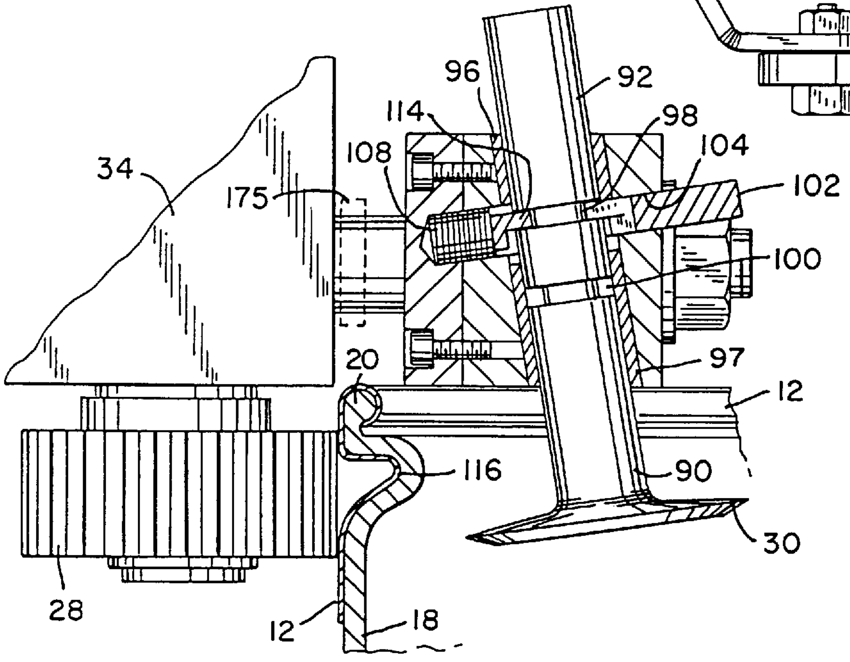
FIG. 5

FIG. 6
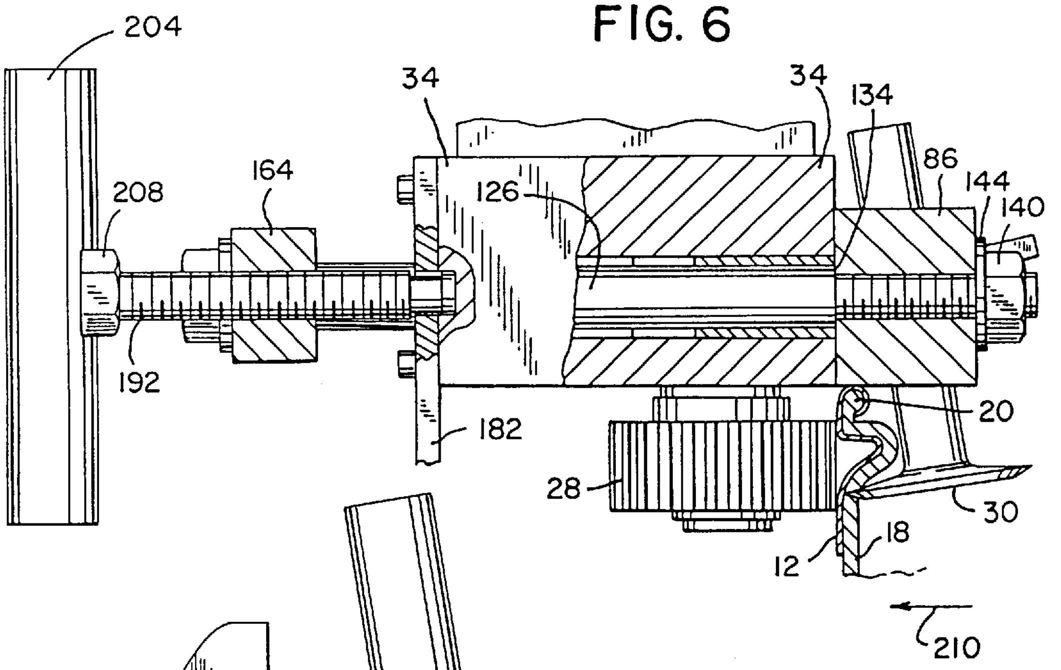
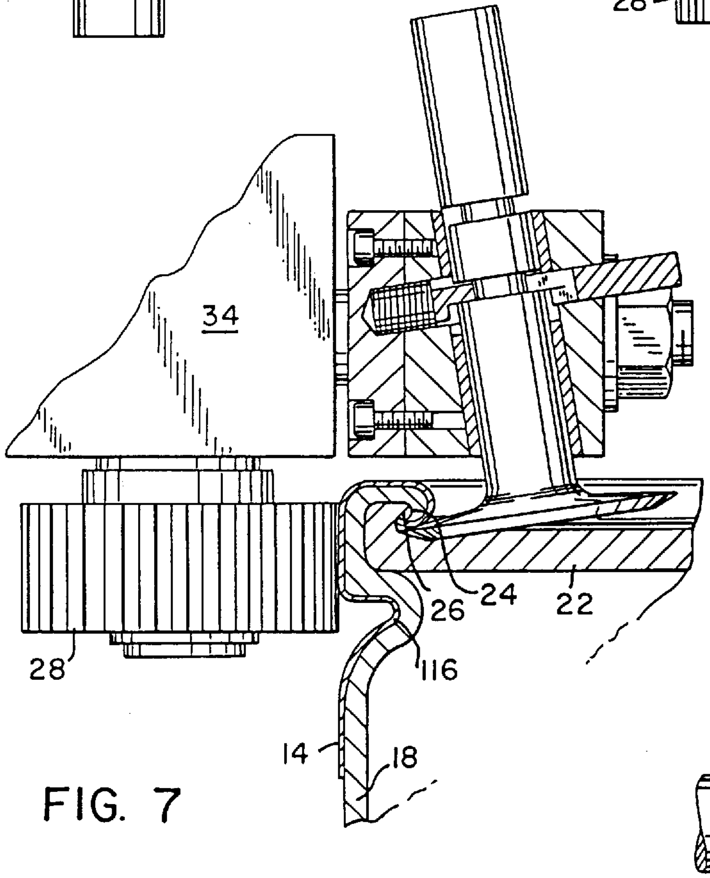
FIG. 7
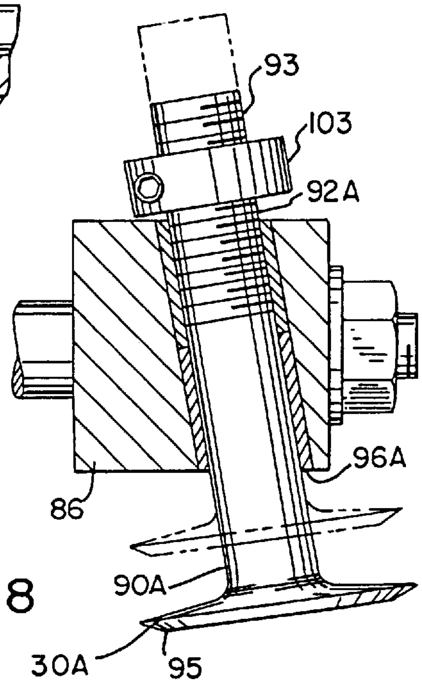
FIG. 8

METHOD OF DISASSEMBLING FIBER DRUMS USING A PORTABLE FIBER DRUM CHIME REMOVER

This is a division of application Ser. No. 08/431,916, entitled "Portable Fiber Drum Chime Remover", filed on Apr. 28, 1995, now U.S. Pat. No. 5,651,183.

BACKGROUND OF THE INVENTION

The invention relates broadly to methods and portable apparatus for disassembling fiber or paperboard drums.

Fiber or paperboard drums normally come in 55 gallon and 30 gallon sizes. The drums have a cylindrical fiber sidewall and a fiber bottom that is attached to the bottom edge of the fiber sidewall with a metal chime mounted continuously around the bottom edge. The bottom metal chime crimps the peripheral edge of the fiber bottom to the lower edge of the fiber sidewall. The bottom metal chime extends up along the outer surface of the fiber sidewall for about one or two inches. An upper metal chime is also mounted continuously around the upper edge of the fiber sidewall. The upper metal chime facilitates the use of clamps to clamp a top onto the drum.

Fiber or paperboard drums are normally used as shipping containers which when emptied must be disposed of. It is becoming more expensive to dispose empty fiber drums in landfills, and some landfills have even been closed to fiber drums. Recycling the fiber or incinerating the fiber are often the only practical means for disposing of the empty drums.

In order to dispose of the fiber by incineration or recycling, the drums must be disassembled and the metal chimes must be removed. Once the metal chimes are removed, the remaining fiber can be shredded, crushed and baled, or otherwise prepared for incineration, recycling or other means of efficient disposal. Commercially available machines to remove metal chimes from fiber drums tend to be large, expensive machines. Not all fiber drum users can justify the expense of these large, expensive dechiming machines.

SUMMARY OF THE INVENTION

The invention is a portable fiber drum chime remover, and a method of using the chime remover to efficiently disassemble fiber drums. The portable fiber drum chime remover can be manufactured at much less cost than conventional dechiming machines, and is suitable for dechiming fiber drums on location.

In one aspect, the invention is a portable fiber drum chime remover for disassembling a fiber drum. The preferred chime remover has a carrier with a generally vertical drive shaft bearing hole. A drive shaft is journaled within the drive shaft bearing hole and a rotatable drive wheel is mounted to the drive shaft. The drive wheel is disposed to engage an outer surface of the metal chime. The chime remover also has a front housing having a cutter shaft bearing hole. A rotatable cutting wheel, having a cutting head and a cutter shaft projecting perpendicularly from the cutting head, is mounted for rotation through the cutter shaft bearing hole in the front housing. The cutter shaft bearing hole preferably slants away from the carrier, so the cutting head slants downward towards the drive wheel. The cutter shaft is mounted in the front housing so that the cutting head is disposed to engage an inner surface of the fiber sidewall opposite the rotatable drive wheel. A cutting wheel stop limits axial movement of the cutter shaft relative to the cutter shaft bearing hole in the front housing. To cut the fiber sidewall, the cutting head is engaged against the inner surface of the fiber sidewall and the drive wheel is driven to move the chime remover around the chime.

In one embodiment, the cutter shaft has a first circumferential groove, and preferably another circumferential groove, in which the cutting wheel stop can engage to limit the axial movement of the cutter shaft relative the front housing. The position of the cutting head relative to the front housing can be selected by engaging the cutting wheel stop in the desired circumferential groove.

In another embodiment, the cutting wheel stop limits the lowest position relative to the front housing that the cutting head can slide, but the cutting head would be free to slide upwards except for being guided by grooves or ribs associated with the fiber sidewall or chime. The preferred way of carrying out this embodiment is to have threads on the cutter shaft on the end of the cutter shaft opposite the cutting head, and slidably mounting the cutter shaft in the front housing so that some of the threads are exposed above the front housing. A threaded shaft collar can then be screwed on to the exposed threads to limit the axial movement of the cutter shaft.

Although the chime will normally be deformed by teeth in the drive wheel when the drive wheel and the cutting head are engaged to cut the fiber sidewall, it is preferred that the fiber drum chime remover include a restraint element or spacer to keep the cutting head from coming in direct contact with the drive wheel. This prevents the cutting head from becoming damaged prematurely.

In another aspect, the invention is a method for disassembling a fiber drum that is especially well suited for the portable fiber drum chime remover described above. The method includes standing the fiber drum on the lower metal chime and removing the upper metal chime by engaging a rotatable drive wheel against an outer surface of the chime and a rotatable cutting head against the fiber sidewall opposite the drive wheel, and rotating the drive wheel to move the drive wheel and the cutting head around the upper chime to cut the upper edge of the sidewall. The next step is to place the fiber drum on the cut upper edge of the sidewall, and remove the lower metal chime by engaging the drive wheel against an outer surface of the lower chime and engaging the cutting head against the lower edge of the fiber sidewall and by rotating the drive wheel to move the drive wheel and the cutting head around the lower chime. The invention also includes the same type of method wherein the fiber drum is first placed on the upper metal chime to remove the lower metal chime; and then placed on the cut lower edge of the sidewall to remove the upper metal chime.

It can therefore be appreciated that an object of the invention is to provide a portable fiber drum chime remover that is suitable for disassembling fiber drums on location.

Another object of the invention is to provide a portable fiber drum chime remover that can be manufactured at much less cost than conventional dechiming machines.

Another object of the invention is to provide a portable fiber drum chime remover in which the height of the cutting head is easy to adjust.

Yet another object of the invention is to provide a portable fiber drum chime remover in which the cutting head is protected from premature wear.

Other objects and advantages of the invention should be obvious to one skilled in the art from the following description of the invention as shown in the drawings.

BRIEF DESCRIPTION OF THE DRAWINGS

FIG. 3 is a side elevational view of the portable fiber drum chime remover shown in FIG. 1;

FIG. 5 is a detailed side elevational view showing the portable fiber drum chime remover disposed to engage an upper metal drum;

FIG. 6 is a side elevational view showing the portable fiber drum chime remover engaged for cutting the upper metal chime of a fiber drum;

FIG. 7 is a side elevational view of the portable fiber drum chime remover showing the removal of a lower metal chime from a drum;

FIG. 8 is a detailed view showing another embodiment of the invention.

DETAILED DESCRIPTION OF THE DRAWINGS

Figure 1:
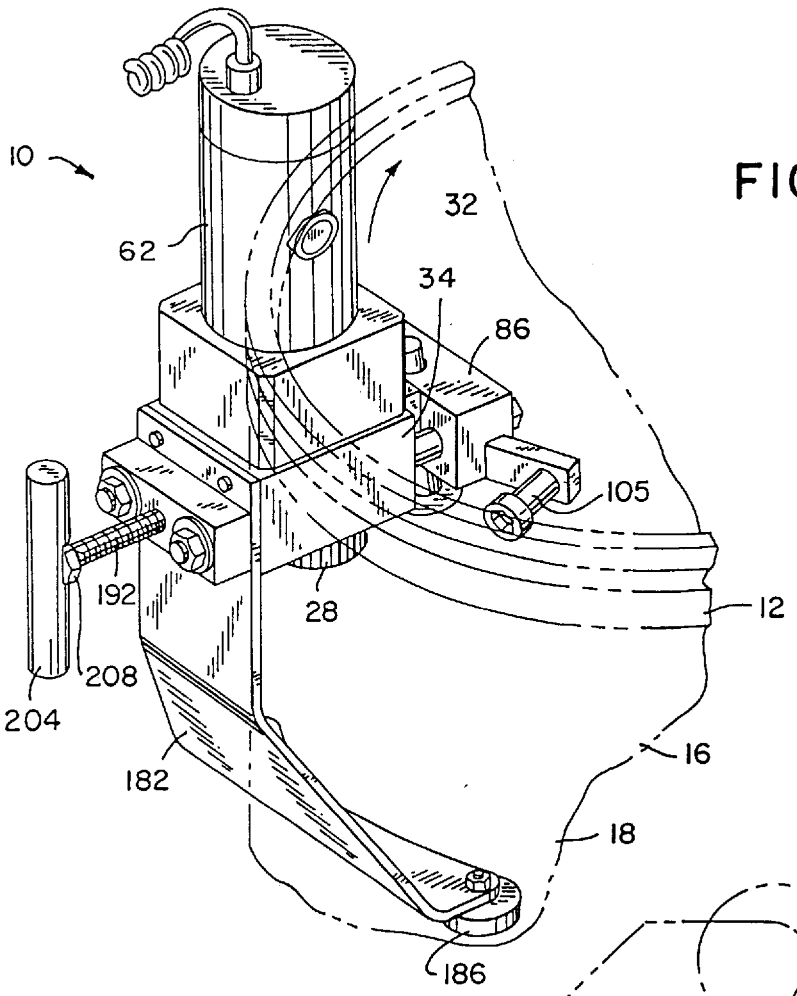
FIG. 1 is a perspective view of a portable fiber drum chime remover in accordance with the invention.
Figure 4:
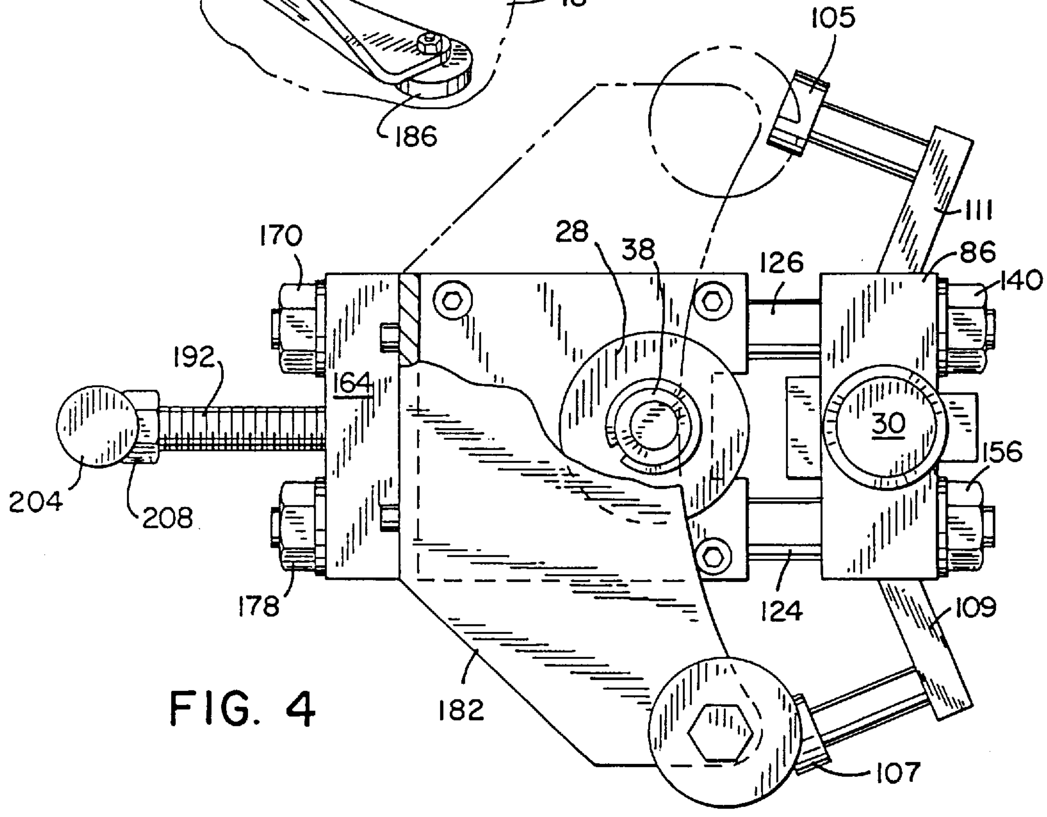
FIG. 4 is a bottom view of the portable fiber drum chime remover shown in FIG. 1.

The drawings illustrate a portable fiber drum chime remover 10 that is used to remove the upper 12 and lower 14 metal chimes from a fiber drum 16. As shown best in FIGS. 5 and 6, the fiber drum 16 has a cylindrical fiber or paperboard sidewall 18, and 12 is continuously mounted around an upper edge 20 of the fiber sidewall 18. As shown best in FIG. 7, the fiber drum 16 also has a fiber bottom 22. The lower metal chime 14 is continuously mounted around the lower edge 24 of the fiber sidewall 18 and the peripheral edge 26 of the fiber bottom 22. The portable fiber drum chime remover 10 is used to remove the upper chime 12 and the lower chime 14 so that the fiber sidewall 18 and fiber bottom 22 can be disposed of.

The portable chime remover 10 has a drive wheel 28 that engages the outer surface of chime 12 or 14, and a cutting head 30 which engages an inner surface of the fiber sidewall 18 opposite the drive wheel 28 to cut the fiber sidewall 18 and remove the chime. The preferred diameter of the cutting head 30 at least 2 inches. Referring in particular to FIG. 1, when the drive wheel 28 is driven to rotate, the portable chime remover 10 travels in a cutting direction (shown by arrow 32) around the chime 12 at the upper end of the drum 16. Depending on the amount of engagement force between the drive wheel 28 and the cutting head 30, it may take one but preferably two or three revolutions around the upper end of the drum 16 to fully cut the upper edge 20 of fiber sidewall 18 to remove the upper metal chime 12. The lower metal chime 14 can be removed in a similar manner.

Figure 2:
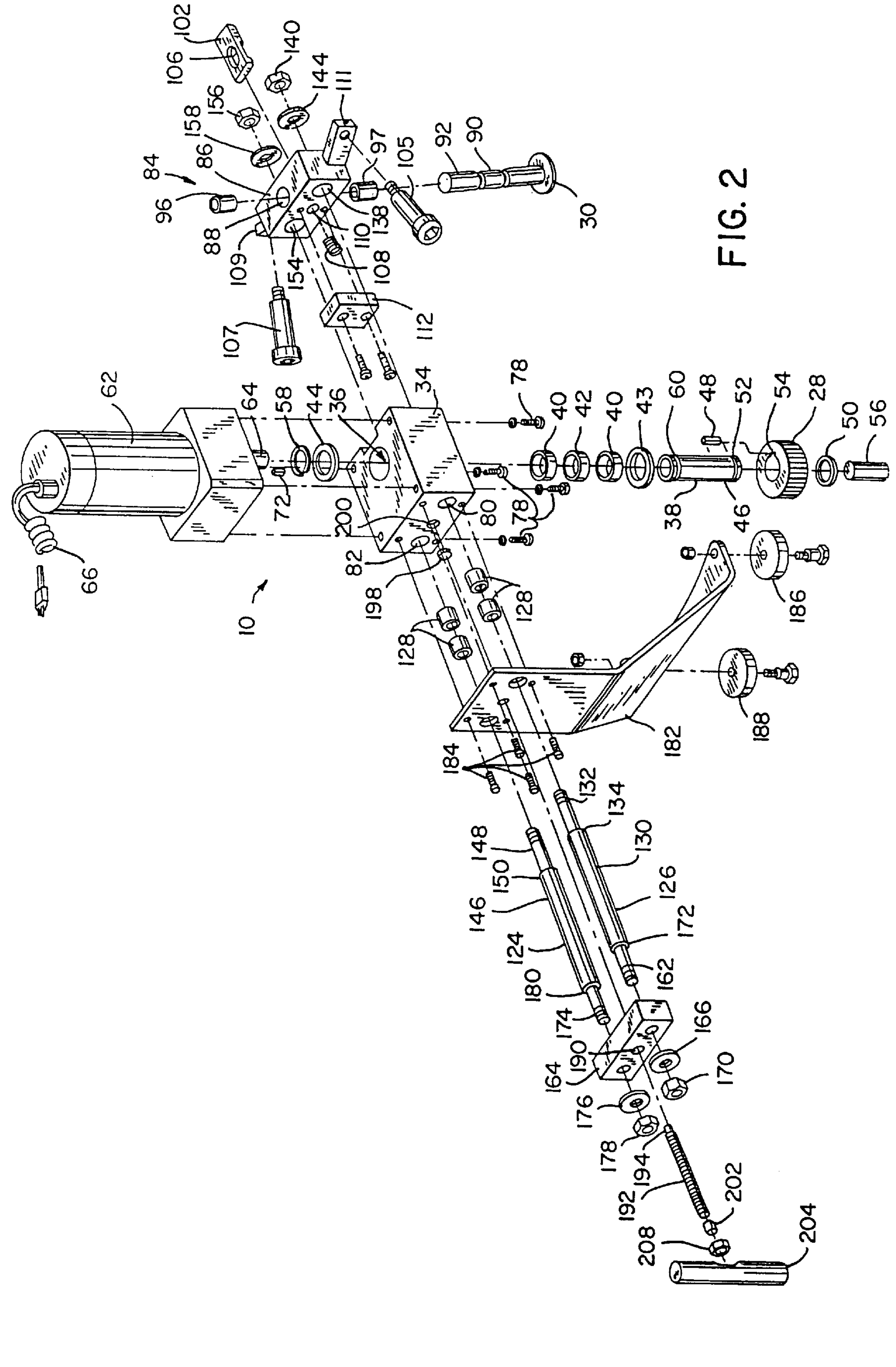
FIG. 2 is an exploded assembly view of the portable fiber drum chime remover shown in FIG. 1.

Referring in particular to FIG. 2, the portable fiber drum chime remover 10 has a carrier 34 to which other components of the chime remover 10 are mounted. The carrier 34 has a generally vertical drive shaft bearing hole 36. A hollow drive shaft 38 is journaled within the drive shaft bearing hole 36. Two needle bearings 40 and a bearing spacer 42 are mounted within the drive shaft bearing hole 36 in the carrier 34. The bearings 40 provide a bearing surface around the drive shaft bearing hole 36 against which the outer cylindrical wall of the drive shaft 38 is rotatably supported. The lower part 46 of the drive shaft 38 extends vertically downward below the carrier 34.

The drive wheel 28 is mounted around the lower part 46 of the drive shaft 38 using a drive wheel key 48 and a snap ring 50. The lower part 46 of the drive shaft 38 has a key slot (not shown) in an outer surface of the drive shaft 38. The drive wheel key 48 resides partially in the key slot in the lower part 46 of the drive shaft 38 and projects therefrom. The drive wheel 28 has a key slot 54 in an inner annular surface of the drive wheel 28. The drive wheel 28 is fixed to the drive shaft 38 by sliding the drive wheel 28 onto the lower part 46 of the drive shaft 38 so that the projecting part of the drive shaft key 48 resides in the key slot 54 in the drive wheel 28. The snap ring 50 snaps into a circumferential groove 52 in the drive shaft 38 underneath the drive wheel 28 to lock the drive wheel 28 onto the drive shaft 38. A plug 56 is pushed into the hollow drive shaft 38 from the bottom. A snap ring 58 snaps into an upper circumferential groove 60 in the drive shaft above the carrier 34 to mount the drive shaft 38 within the drive shaft bearing hole 36. A thrust bearing 43 is located around the drive shaft 38 between the top surface of the drive wheel 28 and the lower surface of the carrier 34. Another thrust bearing 44 is located around the drive shaft 38 between the snap ring 58 and the top surface of the carrier 34.

An electric direct current (DC) motor 62 is mounted to the top surface of the carrier with screws 78. The electric DC motor 62 is preferably a ⅛ horsepower electric DC motor. The electric DC motor 62 has an output shaft 64 that drives the drive shaft 38. The electric DC motor 62 receives conventional AC electric power from a conventional power source through a cord 66. The cord 66 is coiled to help prevent tangling of the cord 66 as the portable chime remover 10 moves around the upper end of the drum 16. The electric motor 62 has a rectifier that converts alternating current electricity supplied through the plug 66 to direct current electricity to power the electric DC motor 62. The output shaft 64 of the DC motor 62 has a key slot (not shown) in which an output shaft key 72 resides. The output shaft 64 is mounted within the hollow drive shaft 38. The hollow drive shaft 38 has a key slot (not shown) which receives the output shaft key 72. It may be desirable to provide a clearance between the output shaft 64 and the inside cylindrical wall of the hollow drive shaft 38.

A cutter assembly 84 is slidably mounted to the carrier 34. The cutter assembly 84 has a front housing 86 with a cutter shaft bearing hole 88 at a 90° angle from a vertical plane away from the drive wheel 28. Bearings 96 and 97 are located in the cutter shaft bearing hole 88 to provide a bearing surface. A cutting wheel 90 has a cutting head 30 and a cutter shaft 92 projecting perpendicularly therefrom. The cutter shaft 92 is slidably mounted through bearings 96 and 97 in the cutter shaft bearing hole 88. The cutter shaft 92 has an upper circumferential groove 98 and a lower circumferential groove 100. A cutting wheel stop 102 spring mounted in a slot 104 in the front housing 86 sets the position of the cutting head 30 relative to the front housing by engagement in either the top circumferential groove 98 or the lower circumferential groove 100. The cutting wheel stop 102 has an oblong hole 106 through which the cutter shaft 92 can slide. A spring 108 is placed in a spring access hole 110 in the front housing 86, and a spring backing plate 112 is screwed onto the front housing 86 behind the spring 108. The spring 108 pushes against the cutting wheel stop 102 to keep a front lip 114 of the cutting wheel stop 102 engaged in either groove 98 or groove 100. In order to adjust the height adjustment of the cutting head 30, the user pushes the cutting wheel stop 102 against the spring 108 to release the engagement of the front lip 114 of the stop 102 from the groove, and then slides the cutter shaft 92 through the oblong hole 106 so that the stop lip 114 can engage the other groove. As shown in FIG. 5, the position of the upper cutter shaft groove 98 should be at the appropriate height along the cutter shaft 92 so that the cutting head 30 cuts below the strength rib or crimp 116 around the upper edge 20 of the drum 16. Referring to FIG. 7, the position of the lower circumferential groove 100 in the cutter shaft 92 should be positioned so that the cutting head 30 engages between the strength rib or crimp 116 and the lower chime roll.

FIG. 8 shows another mechanism in which the cutter shaft **92*a* can be mounted through the cutter shaft bearing hole 88**.

In FIG. 8, the upper part of the cutter shaft 92*a* has threads 93. At least some of the threads 93 are exposed above the front housing 86 when the cutter shaft 92*a* is slidably mounted through the bearings 96*a* in the cutter shaft bearing hole 88. A collar 103 is screwed onto the exposed threads 93 of the cutter shaft 92*a*. The collar 103 acts as a stop to limit the lowest position relative to the front housing 86 that the cutting head 30*a* can slide. The collar 103 preferably has a screw or socket-type lock which locks the position of the collar 103 on the threads 93 when an appropriate sidewall cutting height has been selected. When the cutting head 30*a* is in the lowest relative position of the cutting head 30*a* from the front housing 86, the cutting head 30*a* should be in a position to cut below the drum strength rib or crimp 116 around the upper edge 20 of the drum 16. This is the appropriate position of the cutting head 30*a* when removing the upper metal chime 12. When the embodiment in FIG. 8 is used to cut the lower metal chime 14, the bottom edge 95 of the cutting head 30*a* presses against the fiber bottom 22 of the drum 16 to push the cutter shaft 92*a* upward. The cutting head 30*a* is wedged between the metal chime 14 and the fiber bottom 22. The peripheral edge 26 of the fiber bottom 22 and the lower edge 24 of the fiber sidewall 18 can therefore be cut in the appropriate location to remove the lower metal chime 14.

Some fiber drums do not have a fiber bottom attached to the drum with a lower metal chime. The chimes in these kinds of drums typically do not have circumferential strength ribs or crimps. When cutting drums of this type, it is preferred that the cutting head be set in the position farthest from the front housing.

Referring again to FIGS. 1 and 2, the front housing 86 is supported on the drum chime 12 or 14 by chime rollers 105 and 107. The front housing 86 preferably has a chime roller bracket 109 mounted on a side of the housing 86 facing the cutting direction 32, and a chime roller bracket 111 mounted on the trailing face of the front housing 86. Chime roller 107 is attached to chime roller bracket 109, and chime roller 105 is attached to chime roller bracket 111. It is preferred that the height of the chime rollers 105 and 107 be substantially equal relative to one another.

The cutting assembly 84 generally, and the front housing 86 in particular, are slidably mounted to the carrier 34 using guide shafts 124 and 126. Referring in particular to FIG. 2, bearings 128 are located in horizontal guide shaft bearing holes 80 and 82, and the guide shafts 126 and 124 are slidably mounted through the bearings 128 in holes 80 and 82, respectively. Guide shaft 126 has a central bearing portion 130, a front portion 132 with threads having a smaller diameter than the central bearing portion 130, and a shoulder 134 between the central bearing portion 130 and the front portion 132. The front portion 132 of the guide shaft 126 passes through a guide shaft hole 138 in the front housing 86 and is mounted to the front housing 86. The shoulder 134 abuts against the front housing 86 when the guide shaft 124 is mounted to the front housing 86 (see FIG. 6). The guide shaft 126 is mounted to the front housing 86 by tightening a nut 140 onto the threads on the front portion 132 of the guide shaft 26. A flat washer 144 is preferably located between the nut 140 and the front housing 86.

Guide shaft 124 is preferably identical to guide shaft 126. Guide shaft 124 has a central bearing portion 146, a front portion 148 with threads, and a shoulder 150. The front portion 148 of guide shaft 124 is mounted through a guide shaft hole 154 in the front housing 86 so that the shoulder 150 abuts the front housing 86. A nut 156 and washer 158 are tightened onto the threads in the front portion 148 of the guide shaft 124 to mount the guide shaft 124 to the front housing 86.

A rear portion 162 of guide shaft 126 is mounted through a hole in a rear housing 164 using a flat washer 166 and a nut 170. A rear shoulder 172 on the guide shaft 126 is tightened against the rear housing 164 when nut 170 is tightened. Likewise, guide shaft 124 has rear portion 174 that is mounted through another hole in the rear housing 164 by tightening a flat washer 176 and a nut 178 until a rear shoulder 180 of the guide shaft 124 is tightened against the rear housing 164.

The rear housing 164 has a generally horizontal, threaded push rod guide hole 190. A threaded push rod 192 is screwed through the threaded push rod guide hole 190 in the rear housing 164. The threaded push rod 192 has a non-threaded front portion 194 which has a smaller diameter than the remaining portion of the threaded push rod 192. The front portion 194 of the push rod 192 abuts against a hardened steel plug 198 located in a cylindrical push rod opening 200 in the carrier 34. A piece of tubing 202 is slid over the threaded push rod 192, and a nut 208 and a T-bar handle 204 are screwed onto the rear end 206 of the threaded push rod 192.

A guide roller bracket 182 is attached to the rear surface of the carrier 34 by screws 184. The guide roller bracket 182 depends from the carrier 34, and guide rollers 186 and 188 are attached to the bottom of the bracket 182. The guide rollers 186 and 188 are disposed to engage the fiber drum sidewall 18, and stabilize the portable chime remover 10 as the chime remover travels around the drum 16. Referring in particular to FIG. 6, the T-bar handle 204 can be turned to push the rear housing 164 away from the guide roller bracket 182 and push the carrier 34 towards the front housing 86 to engage the cutting head 30 to cut the fiber sidewall and remove the chime. As the T-bar handle 204 is turned, the drive wheel 28 engages the outer surface of the chime, and the cutting head 30 is pulled towards the drive wheel 28 in the direction of arrow 210 to cut the fiber sidewall. Once the cutting head 30 is engaged to cut the fiber sidewall, the electric DC motor 62 can be turned on to drive the drive wheel 28 and cause the portable chime remover 10 to travel around the drum 16.

While it is desirable for the cutting head 30 to be engaged against the drive wheel 28 so that the chime becomes deformed in the teeth of the drive wheel, it is not desirable that the engagement be so tight that the cutting head 30 contacts the drive wheel 28. Direct contact between the drive wheel 28 and the cutting head 30 may cause the cutting head 30 to wear prematurely. In order to provide for the appropriate chime deformation as well as prevent direct contact between the cutting head 30 and the drive wheel 28, it is preferred that the drive wheel 28 have a knurled edge in which the teeth of the knurled edge are substantially vertical. It is preferred that there be no more than ten teeth per inch around the knurled edge of the drive wheel 28. Also, it is desirable that the front housing 86 not be tightened against the carrier 34 to such an extent that the cutting head 30 comes in contact with the drive wheel 28. If the cutting wheel 90 is mounted so that the cutting head 30 may come in direct contact with the drive wheel 28, it may be desirable to place a spacer 175 around each guide shaft 126 and 124 between the front housing 86 and the carrier 34.

In normal operation, the portable fiber drum chime remover 10 can be used to disassemble a fiber drum 16 by first placing the fiber drum 16 on the lower metal chime 14, and removing the upper metal chime 12 by engaging the drive wheel 28 against the outer surface of the chime 14 and the cutting head 30 against an inside surface of the fiber sidewall opposite the drive wheel 28 and by turning on electric motor 62 to drive the drive wheel 28 and move the portable chime remover 10 around the upper chime 12 to cut the upper edge of the fiber sidewall 18. Once the upper edge of the fiber sidewall 18 is cut, the fiber drum should be placed on the cut upper edge, and the lower edge of the sidewall 18 should be cut in substantially the same manner as described above. However, since the fiber sidewall 18 at the lower metal chime 14 is cut at a point which is not beyond the strength rib or crimp 116, the lower metal chime 14 will not normally fall off of the drum 16 automatically. Therefore, it may be desirable to cut or snip the lower metal chime 14 to remove the chime 14 from the drum 16. A snipping device, knife, saw or other apparatus can be used to cut or snip the lower metal chime 14 to relieve the tension of the chime 14 around the drum and easy removal of the chime 14.

Alternatively, some users may wish to remove the lower metal chime 14 before removing the upper metal chime 12. This can be done in substantially the same way as described above and should be considered to be within the scope of the invention.

Once the upper chime 12 and the lower chime 14 have been removed, and the fiber bottom 22 disassembled from the fiber sidewall 18, the fiber sidewall 18 and the fiber bottom 22 can be stored for proper disposal. One convenient way of storing the fiber sidewalls for disposal is to place a first cylindrical sidewall on a pallet. Then, after removing the upper and lower metal chimes from a second fiber drum to free the cylindrical sidewall of the second drum, slitting the second sidewall from a top edge to a bottom edge thereby allowing the second cylindrical fiber sidewall to be opened along the slit. The slit sidewall can then be pulled open along the slit and placed around the fiber sidewall of the first drum on the pallet. Subsequent fiber drums can be placed on the pallet in the same manner.

It is recognized that various equivalents, alternatives and modifications are possible within the scope of the invention and should be considered to fall within the scope of the appended claims. For instance, it should be apparent to one skilled in the art that there may be other means for driving the drive wheel, tilting the cutting head, or adjusting the height of the cutting head, and these ways should be considered within the scope of the appended claims.

We claim:

1. A method for disassembling a fiber drum having a fiber sidewall with an upper edge and a lower edge, a fiber bottom, an upper metal chime mounted continuously around the upper edge of the sidewall and extending down an outer surface of the sidewall, and a lower metal chime that attaches the fiber bottom to the lower edge of the fiber drum which is mounted continuously around the lower edge of the sidewall and extends up the outer surface of the sidewall, the method including the use of a portable fiber drum chime remover having a rotatable drive wheel and a rotatable cutting head, the method comprising the steps of:

placing the lower metal chime of the fiber drum on a flat surface;

engaging the rotatable drive wheel of the portable fiber drum chime remover against an outer surface of the upper chime and the rotatable cutting head against an inner surface of the fiber sidewall opposite the drive wheel and driving the rotatable drive wheel to move the drive wheel and the cutting head around the upper chime to cut the inner surface of the fiber sidewall adjacent the upper edge of the fiber sidewall;

removing the upper chime from the fiber drum;

placing the cut upper edge of the sidewall of the fiber drum on said flat surface;

engaging the rotatable drive wheel of the portable fiber drum chime remover against an outer surface of the lower chime and engaging the rotatable cutting head against an inner surface of the fiber sidewall adjacent the lower edge, and driving the rotatable cutting wheel to move the drive wheel and the cutting head around the lower chime to cut the inner surface of the fiber sidewall adjacent the lower edge of the fiber sidewall; and removing the lower chime and the fiber bottom from the fiber drum.

2. A method as recited in claim 1 wherein the fiber bottom presses against the cutting head when the cutting head is engaged against the inner surface of the fiber sidewall adjacent the lower edge.

3. A method as recited in claim 1 wherein the rotatable drive wheel has teeth and the upper and lower chimes are deformed by the teeth of the drive wheel when the rotatable drive wheel and the rotatable cutting head are engaged but the cutting head does not directly contact the drive wheel teeth.

4. A method as recited in claim 1 wherein the upper metal chime includes a strength rib intermediate its ends and the rotatable cutting head is engaged with the rotatable drive wheel to remove the upper metal chime at a location below the chime strength rib.

5. A method as recited in claim 1 wherein the cutting head of the portable fiber drum chime remover is tilted downwards towards the drive wheel.

6. A method for disassembling a fiber drum having a fiber sidewall with an upper edge and a lower edge, a fiber bottom, an upper metal chime mounted continuously around the upper edge of the sidewall and extending down an outer surface of the sidewall, and a lower metal chime that attaches the fiber bottom to the lower edge of the fiber drum which is mounted continuously around the lower edge of the sidewall and extends up the outer surface of the sidewall, the method including the use of a portable fiber drum chime remover having a rotatable drive wheel and a rotatable cutting head, the method comprising the steps of:

placing the upper metal chime of the fiber drum on a flat surface;

engaging the rotatable drive wheel of the portable fiber drum chime remover against an outer surface of the lower chime and the rotatable cutting head against an inner surface of the fiber sidewall opposite the drive wheel and driving the rotatable drive wheel to move the drive wheel and the cutting head around the lower chime to cut the inner surface of the fiber sidewall adjacent the lower edge of the fiber sidewall;

removing the lower chime and the fiber bottom from the fiber drum;

placing the cut lower edge of the sidewall of the fiber drum on said flat surface;

engaging the rotatable drive wheel of the portable fiber drum chime remover against an outer surface of the upper chime and engaging the rotatable cutting head against an inner surface of the fiber sidewall adjacent the upper edge, and driving the rotatable cutting wheel to move the drive wheel and the cutting head around the upper chime to cut the inner surface of the fiber sidewall adjacent the upper edge of the fiber sidewall; and removing the upper chime from the fiber drum.

* * * * *